United States Patent [19]
Benson

[11] Patent Number: 5,799,321
[45] Date of Patent: Aug. 25, 1998

[54] REPLICATING DELETION INFORMATION USING SETS OF DELETED RECORD IDS

[75] Inventor: Max L. Benson, Redmond, Wash.

[73] Assignee: Microsoft Corporation, Redmond, Wash.

[21] Appl. No.: 678,967

[22] Filed: Jul. 12, 1996

[51] Int. Cl.$^6$ .................................................. G06F 17/30
[52] U.S. Cl. .......................................... 707/201; 707/204
[58] Field of Search .................................. 707/206, 203, 707/201, 8, 204

[56] References Cited

U.S. PATENT DOCUMENTS

| | | | |
|---|---|---|---|
| 4,714,992 | 12/1987 | Gladney et al. | 707/206 |
| 4,714,995 | 12/1987 | Materna et al. | 707/201 |
| 4,714,996 | 12/1987 | Gladney et al. | 707/203 |
| 5,218,699 | 6/1993 | Brandle et al. | 395/650 |
| 5,247,676 | 9/1993 | Ozur et al. | 395/650 |
| 5,261,094 | 11/1993 | Everson et al. | 707/201 |
| 5,283,856 | 2/1994 | Gross et al. | 395/51 |
| 5,577,240 | 11/1996 | Demers et al. | 707/8 |
| 5,649,195 | 7/1997 | Scott et al. | 707/201 |

OTHER PUBLICATIONS

Shirley, John and Rosenberry, Ward, "Microsoft RPC Programming Guide", O'Reilly & Associates, 1995, pp. 1–232.

Kramer, Matt, "Baranofs MailCheck 2.6 Delivers Improved Tools", PC Week, Sep. 11, 1995, Ziff–Davis Publishing Company 1995, pp. 1–3.

Frenkel, Gary, "cc:Mail View Keeps an Eye on Your Messaging System", Network Computing, Jun. 1, 1995, CMP Publications, Inc., 1995, pp. 1–3.

Agrawal et al, Coding Replication Schemas for Distributed Systems, IEEE, pp. 240–251, Mar. 1995.

Agrawal et al, Availability of Coding Based Replication Schemes, IEEE, pp. 103–110, Oct. 1992.

Agrawal et al. Storage Efficient Replicated Databases, IEEE, pp. 342–352, Sep. 1990.

Son, A Resilient Replication Method in Distributed Database Systems, IEEE, pp. 363–372, Apr. 1989.

*Primary Examiner*—Thomas G. Black
*Assistant Examiner*—Frantz Coby
*Attorney, Agent, or Firm*—Workman, Nydegger & Seeley

[57] ABSTRACT

Deleted database records are identified not by the use of tombstones (pairs of record IDs and change numbers) but by storing for each database replica a set of deleted record IDs without associated change numbers (DRID data). The DRID data can include not only IDs of deleted records but also IDs that were never assigned to the database by the server (e.g., IDs assigned to records of other databases). The DRID data can be compactly stored as a list of intervals, with each interval describing a range of IDs across which records have either been deleted or never assigned to the database. Replication is accomplished by periodically sending the DRID data, or incremental versions thereof, to other replicas, which delete records identified by the received DRID data, and update their existing DRID data by combining it with received DRID data.

14 Claims, 6 Drawing Sheets

Record ID (RID)

REPLICATING DELETION INFORMATION USING SETS OF DELETED RECORD IDS

BACKGROUND OF THE INVENTION

The invention relates to database replication, and to techniques for conveying information about deleted records from one database replica to another.

Database replication typically requires that records deleted in one replica of the database also be deleted in all other replicas. This is conventionally achieved by storing a "tombstone" for each deleted record. The tombstone contains the record ID of the deleted record and a change number assigned by the server on which the deletion occurs. Each time a record is deleted from a database, the record ID of the deleted record is assigned a new change number. The pair of numbers is a new tombstone, which is added to an ever growing list of tombstones. During replications, tombstones are sent to other replicas to ensure that the same deletions occur everywhere.

An advantage of assigning change numbers to each deleted record is that it is not always necessary to send the entire list of tombstones to update a replica. In general, only tombstones with change numbers greater than the largest change number sent at the last replication need be sent again. But because a new tombstone is added every time a record is deleted, the accumulated number of tombstones can become huge as a database ages. For example, a database in which there are many short-lived records, the number of tombstones could be many times larger than the number of active records, and potentially occupy more storage space than the database, itself. In order to keep the size of the tombstone list manageable, the tombstones can be set to expire and be deleted automatically. However, since the deleted information is unavailable, replicas which may have been out of synch prior to the deletion have no way of becoming synchronized again, thereby resulting in the replicas becoming permanently out of synch.

SUMMARY OF THE INVENTION

The invention departs from the use of tombstones for storing and communicating deletion information. Instead of tombstones, the invention stores sets of deleted record IDs, without their associated change numbers. Preferably, the sets also include record IDs that can never be assigned to a given database, such as IDs that are assigned to other databases. Storing such record IDs increases the total number of record IDs, but advantageously fills in gaps in the set, thereby making it possible to compactly represent the set of IDs as a list of intervals. Preferably, the set of record IDs is compressed using an interval encoding scheme (as disclosed in my copending application, entitled "Compressing Sets of IDs", filed on even date herewith, and incorporated herein by reference). In one embodiment of the present invention, the compressed set of IDs is periodically sent to other replicas, which update their ID sets by adding IDs contained in the received sets.

An advantage to the present invention is that the number of intervals required to represent the IDs can never become very large. For example, the number of intervals is limited by the number of records in the database plus the number of replicas, thereby making it unnecessary to ever discard IDs. The high degree of compression makes it efficient to send the entire set of IDs when updating other replicas, although preferably only an incremental set of IDs is sent, representing IDs deleted or assigned elsewhere since the last replication.

In general, for each of a plurality of replicas of a database, the invention stores sets of deleted record identification (DRID) numbers that identify records deleted from the database. The sets of record identification numbers are stored without associated change numbers. When a record is deleted from a replica, its record identification number is added to the sets. Replication of deleted record information is achieved by exchanging information descriptive of these sets.

Implementations of the invention may include one or more of the following features.

A first set of DRIDs may be represented by a list of intervals, each interval describing a range of DRIDs that have been deleted from a replica of the database.

In addition to IDs of deleted records, the first set of DRIDs may include IDs assigned for purposes other than to identify records in the database, such as those IDs which are used to identify records of other databases.

A second set of DRIDs, identified as DRID_Sent in a preferred embodiment, may be stored in conjunction with the first set, wherein the second set represents DRIDs of the first set that have previously been sent to other replicas, and wherein the sets of DRIDs exchanged between replicas comprises incremental sets of DRIDs, DRID_Incremental in a preferred embodiment, representing the difference between the first set of DRIDs and DRID_Sent.

A third set of record IDs (RIDS) may be stored for each replica; the third set (Rid_Contained in a preferred embodiment) has RIDs for records contained in the replica. During replication, the sets of DRIDs received from other replicas are compared to the third set to determine whether records in the replica should be deleted.

The RIDs may comprise the combination of a computer identification number and a unique serial number (SN) assigned by the computer on which the record was created.

A block of serial numbers may be assigned to a given database to permit contiguous serial numbers to be assigned to a plurality of records created in the same database by a computer, thereby reducing the number of intervals necessary to represent the set of deleted or unassigned RIDs for the database.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features of the invention will be apparent from the following description of preferred embodiments and from the claims.

DESCRIPTION OF THE PREFERRED EMBODIMENTS

Figure 1:
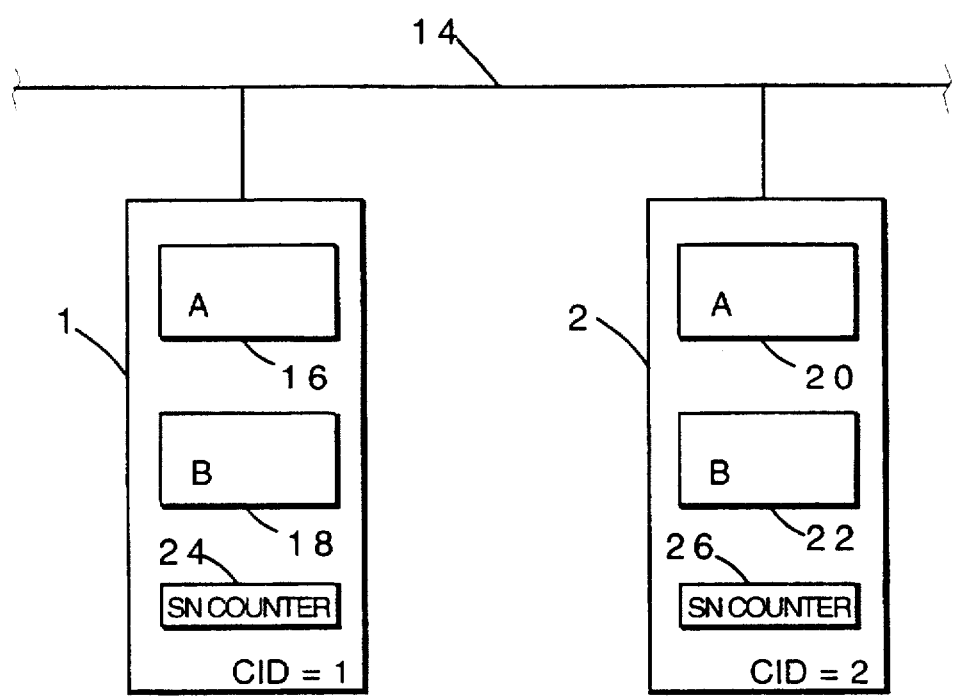
FIG. 1 is a block diagram showing a system of networked computers on which replicas of two databases are stored.

Shown in FIG. 1 is a system of computers (servers) 1, 2 connected by a network communication channel 14. Each computer is identified by a unique computer ID (CID). Stored on computer 1 are replicas 16, 18 of databases A and B, respectively. Computer 2 also stores replicas 20, 22 of the same two databases. In the preferred embodiment databases A and B are public folders of a messaging system, and the database records correspond to messages contained within the public folders. Of course, the invention is not limited to such databases; to the contrary, the invention has broad application to databases generally.

Figure 5:
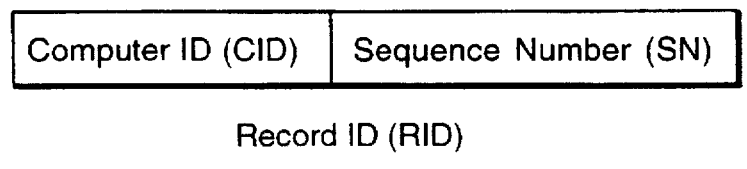
FIG. 5 shows the makeup of a Record ID.

As is typical in replicated database environments, it is desirable to synchronize the replicas—to make sure that each is updated to reflect records created, modified, or deleted in other replicas. In the preferred embodiment of the present invention shown in FIG. 1, each computer has an SN counter 24, 26 that is used to sequentially assign serial numbers whenever database records are newly created on that computer. Any database record in the system can be identified by its record ID (RID), which in the preferred embodiment consists of the CID of the computer on which it was first created and the SN assigned by the creating computer (FIG. 5), but which could have various other forms so long as the ID is unique across the system. When a database record is replicated, its RID is preserved.

Figure 2:
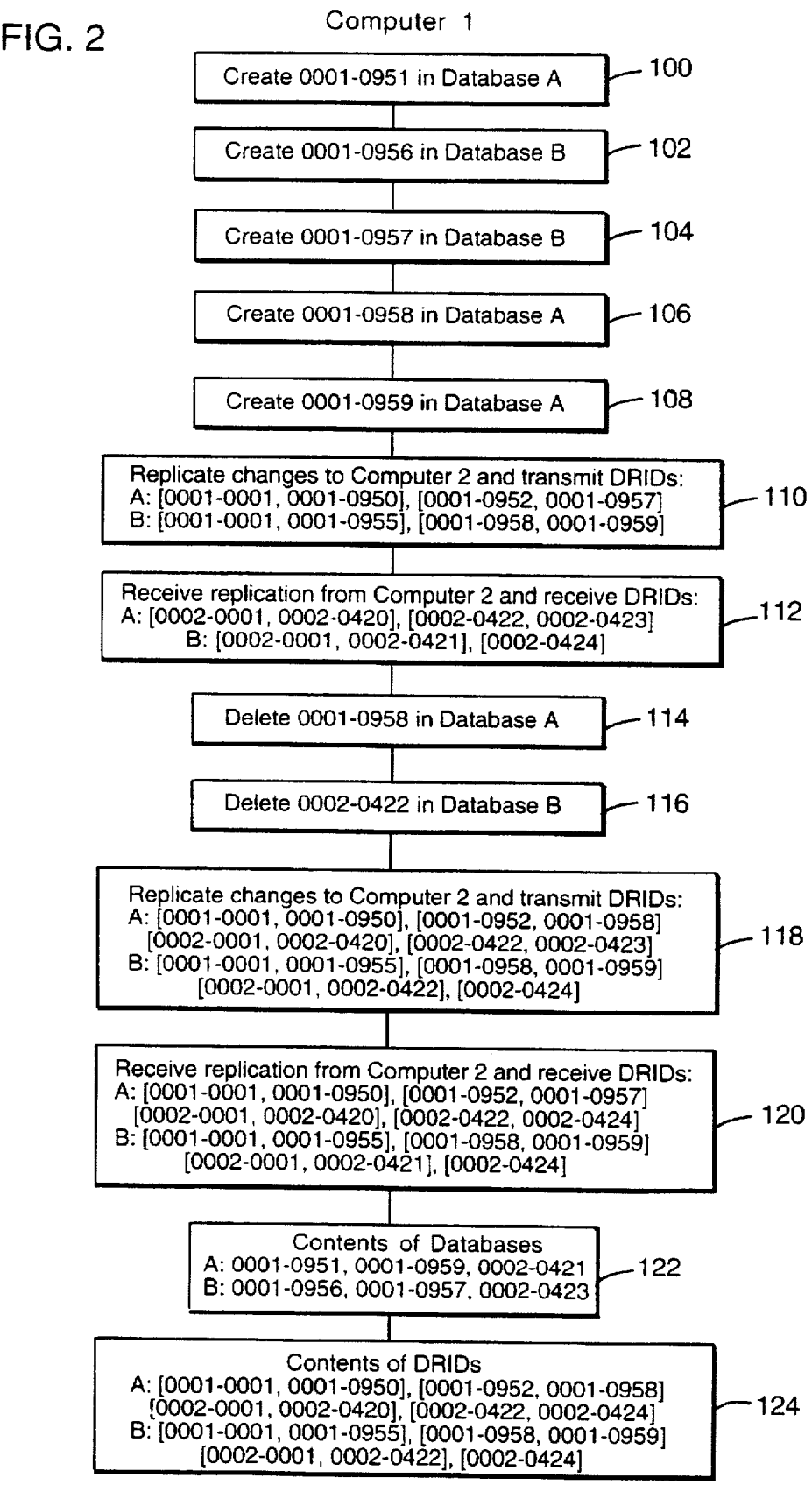
FIG. 2 shows a sequence of steps occurring in replicas of two databases (A and B) stored on a first computer.
Figure 3:
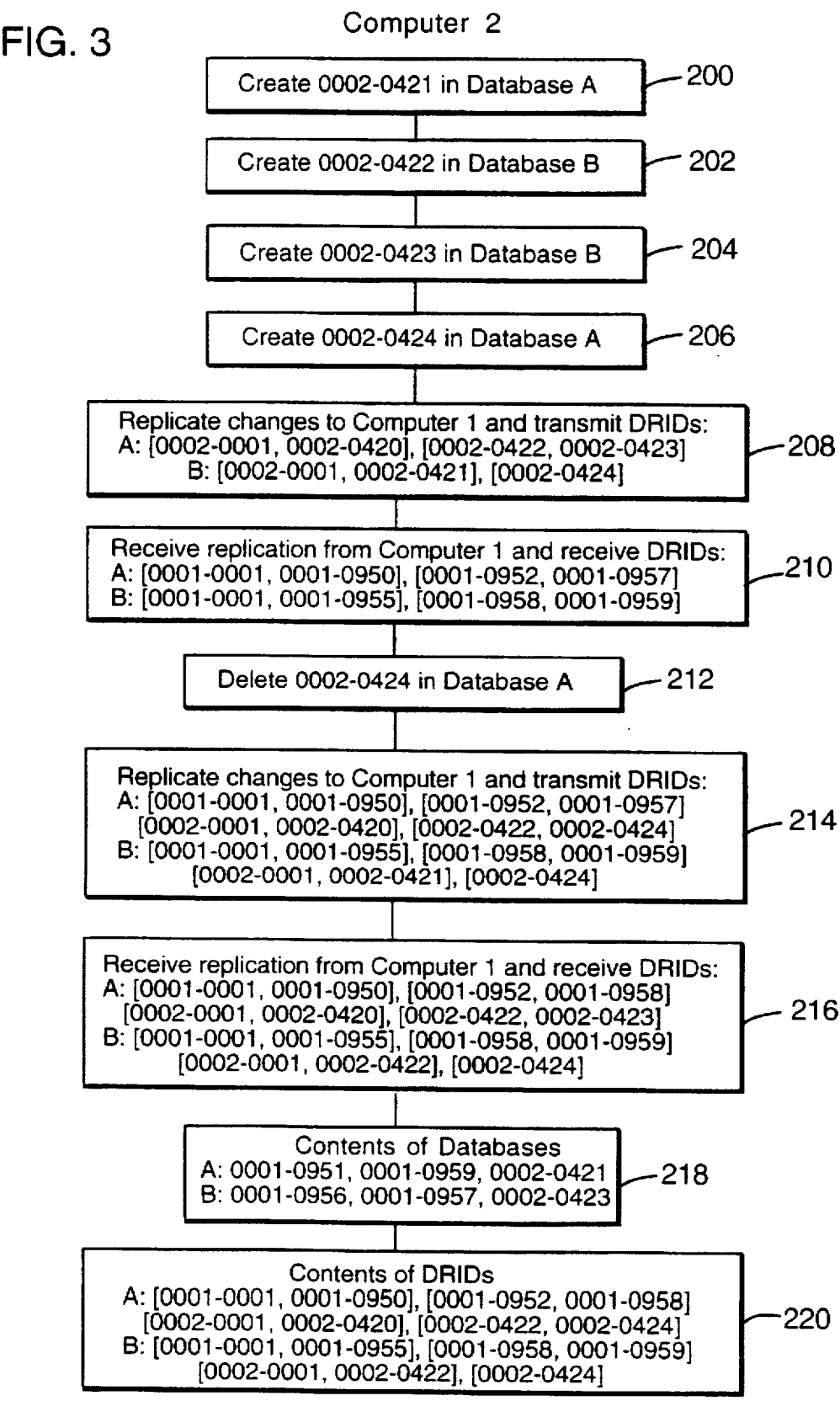
FIG. 3 shows a sequence of steps that occur in replicas of the same two databases on a second computer contemporaneously with the steps that occur on the first computer.

To illustrate the replication process in the described embodiment, consider the example in which computers 1 and 2 complete the steps shown in FIGS. 2 and 3, respectively. In this simplified example, both the CID and SN are 2-byte (16 bit) numbers (with two hexadecimal digits representing each byte). Of course, longer numbers would typically be preferable (e.g., 6-byte numbers) in larger database systems.

As shown at steps 100 through 108 in FIG. 2, five records are created on computer 1, three in database A and two in database B. The RIDs of each record have "0001" as the first number, representing the CID of the computer on which the records were created. The second number of each RID is the SN assigned by the SN counter 24. The first record has an SN of 0951, but the next assigned SN (0956) is not in sequence. This may occur if the serial numbers assigned by the SN counter are also used for records in other databases or for other transactions. To keep the example simple, the remaining sequence numbers are assigned sequentially (which would happen if the records were created without any intervening transactions). While the five records are created on computer 1, four other records are also created on computer 2 (steps 200–206 in FIG. 3). Each receives a CID of 0002 and an SN assigned by the SN counter of computer 2.

At this point in time, a replication update occurs. Although not required, in the described embodiment, replicated changes occur simultaneously on each computer. However, as is well known in the art, replication schedules may vary significantly depending upon many factors including the desired consistency amongst replicas. Changes made by computer 1 are transmitted from computer 1 and received by computer 2 (steps 110 and 210), and vice versa (step 208 and 112). Thereafter, in this example, computer 1 deletes two records at steps 114 and 116, one that it had created (0001–0958) and one that computer 2 had created (0002–0422). Computer 2 also deletes a single record that it had created (0002–0424) at step 212. Finally, a further replication update occurs (steps 214 and 216). After the appropriate updates (i.e. deletions in this case) to the replicas occur, the result on both computers is that each database contains three records (status block 218).

As part of the above replications steps 110, 118, 208, and 214, replication updates of deleted records are performed by transmitting a set of DRIDs for each database. The DRIDs comprise record IDs that are not in the databases either because the DRIDs were deleted in the respective database or because the DRIDs were not originally assigned to the database. The DRIDs are used by the receiving computer to update the deletion information for its replica. Any records in the databases which are contained within the ranges defined by the sets of DRIDs are deleted. Since the sets of DRIDs comprise a range of all records which should not exist within the respective databases, the problem of having potentially out of synch databases, which was possible in certain prior art replication schemes, does not occur. Although this complete deletion information is preserved, in the ordinary course of maintaining synchronized replica, most of the deletions identified by the sets of DRIDs will have already occurred in previous updates or will never have been necessary because the records never existed in the database; therefore, only a fraction of the deletions will usually occur after any given replication.

The DRIDs at the time of the first replication are shown in FIGS. 2 and 3. On computer 1, the DRID for database A (110 and 210) would consist of two RID intervals, 0001–0001 to 0001–0950 and 0001–0952 to 0001–0957, corresponding, respectively, to the RIDs assigned prior to creation of the first record in database A and to the gap between creation of the first record in database A and creation of the second record. On computer 1, the DRID for database B (110 and 210) also consists of two intervals, corresponding to the RIDs assigned prior to creation of the first record in database B, and the two RIDs assigned to database A following creation of records in database B. The DRIDs on computer 2 are a function of the record creation steps shown in FIG. 3, and also turn out to be two intervals long for both databases A and B. Interestingly, the second interval of the DRID for database B on computer 2 comprises a single record, which is possible if the interval between existing records in the database contains only one deleted record.

Replication in the preferred embodiment is performed using a "push" technique, in which every computer simply sends its DRID data to all other computers. But the invention could be applied to other replication processes, e.g., "pull" processes in which a dialogue between computers establishes which replication information is conveyed. In the example of FIGS. 2 and 3, each computer updates its databases by comparing DRIDs received from other computers to the RIDs contained in its database replica. If it finds RIDs in the received DRIDs for which it has records, it deletes those records. Each computer also updates its DRIDs for each database by replacing them with the union of its DRID and the received DRID for that database.

Following the first replication, two record deletions occur on computer 1 (steps 114 and 116) and one deletion occurs on computer 2 (step 212). Then, a second replication occurs. By this time, the DRIDs have each grown to four intervals in size. After the DRIDs are exchanged between replicas, the database contents on both computers is identical. As shown in status blocks 122 and 218, each database ends up with three records. The final composition of the DRIDs following the second replication is shown in status blocks 124 and 220 of FIGS. 2 and 3. The DRIDs are identical on each computer as no deletions or further RID assignments have occurred. Each consists of four intervals.

Figure 6:
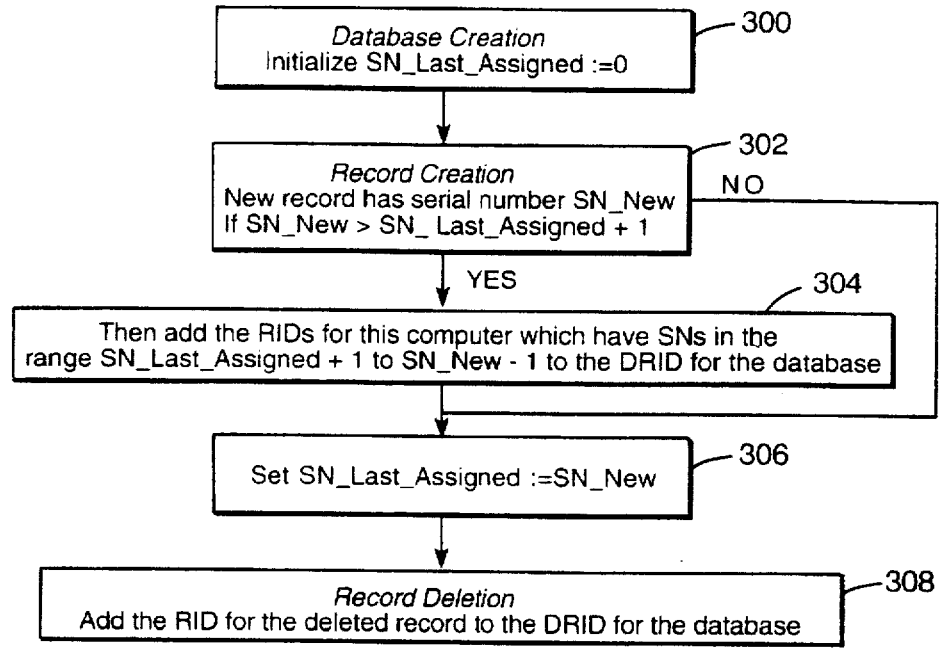
FIG. 6 shows the steps followed to maintain DRID data on a replica during intervals between replication.

FIG. 6 shows the steps followed by the computers 1, 2 with respect to each database in its replica to maintain DRID data during intervals between replications. In the described embodiment, for each database, a variable, SN_Last_Assigned, is initialized to zero at set up (step 300). Then, as each new record is created, a serial number (SN_New) is assigned to the record (step 302). The value of SN_New is determined by incrementing the last serial number used by the computer. SN_New is then compared to SN_Last_Assigned to determine if serial numbers have been assigned for other purposes since the last serial number was assigned to this database. If SN_New is greater than SN_Last_Assigned plus one, then these skipped serial numbers are added to the DRID for the database (step 304). As discussed above, when records are deleted from the database, the RIDs of the deleted records are also added to the DRID.

Figure 4:
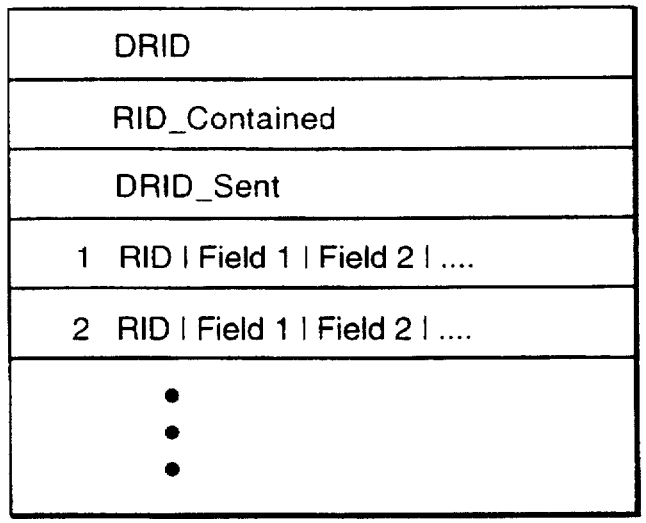
FIG. 4 shows a simplified representation of the data making up each of the database replicas.
Figure 7:
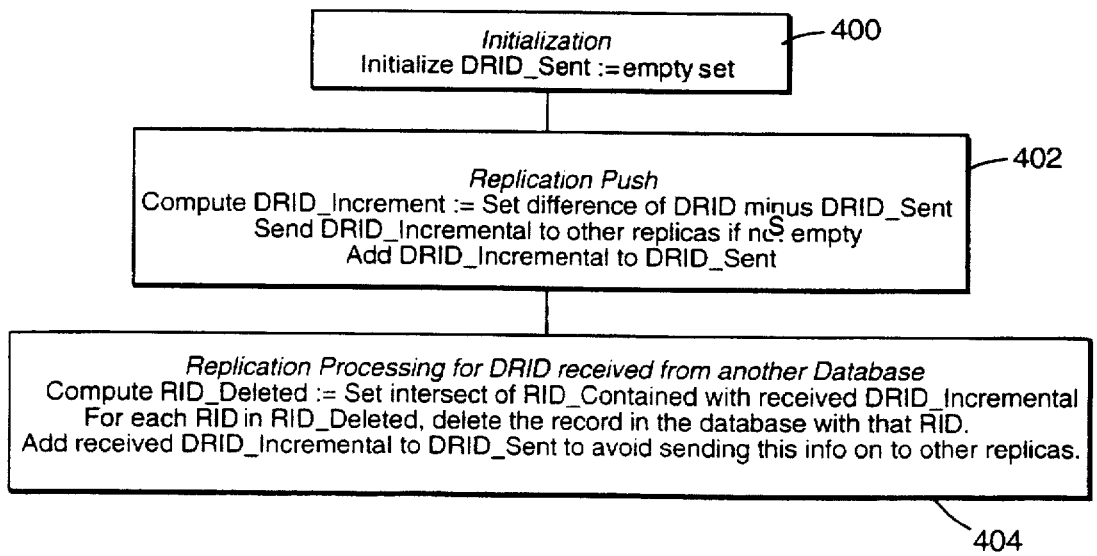
FIG. 7 shows the steps followed during replication to exchange DRID data and synchronize the replicas.

FIG. 7 shows the steps followed for handling DRID data during a replication. The process is a refinement of what was used in the example of FIGS. 2 and 3. Two additional sets of RIDs—RID_Contained and DRID_Sent—are maintained to improve the efficiency of the process. FIG. 4 shows the data contained in a typical replica of a database: three sets of RIDs—DRID, RID_Contained, and DRID_Sent—and the data records associated with the database, each data record having its own RID and data fields. RID_Contained is the set of RIDs for records currently in a computer's replica of a database. The set is maintained by adding RIDs when records are created, and removing RIDs when records are deleted. RID_Sent is the set of RIDs that have already been sent ("pushed" or "pulled") to other replicas in the past. As described below, using the information contained in DRID_Sent allows the computers 1, 2 to minimize the amount of data that needs to be transmitted at each replication.

Two further sets of RIDs are generated and maintained by the computers 1, 2 during replication—DRID_Incremental and DRID_Deleted. DRID_Incremental is the set of RIDs actually sent to other computers during the push process. DRID_Deleted specifies the records that need to be deleted from a replica.

As shown in FIG. 7, DRID_Sent is initialized as an empty set on the creation of a database (step 400). DRID_Incremental is created by forming the set difference between DRID and DRID_Sent. At replication (step 402), DRID_Incremental is sent to the other replicas. DRID_Incremental is descriptive of the full set of DRIDs for a given database as it provides enough information for the other replicas to update their set of DRIDs for that database. DRID_Sent then becomes the union of DRID_Incremental and the DRID_Sent (step 402). Each computer receiving a DRID_Incremental, computes DRID_Deleted by forming the intersection of DRID_Contained and DRID_Incremental (step 404). For each RID contained in DRID_Deleted, the corresponding record is deleted (step 404). As is apparent to those skilled in the art, the replication process is completed by reconciling the changed and new information with the replica. Although not required, to account for the possibility that packets of a replication push can be lost, the entire DRID is occasionally sent to all replicas.

This DRID technique is quite efficient from a storage standpoint. DRID and DRID_Sent can (assuming replicas are fully synchronized) be represented by a set of intervals numbering no more than the number of records currently in the database plus the number of replicas. If the replicas are not exactly in synch, e.g., because of lost replication packets, the storage requirements could be slightly higher. This means that the storage requirements for DRID and DRID_Sent are proportional to the number of records in the database plus the number of replicas.

The reason why the number of intervals required to represent DRID and DRID_Sent cannot be larger than the number of records in the database plus the number of replicas arises from the fact that these sets of RIDs represent intervals of RIDs which are not present in the database. For each CID, if there are N records with RIDs assigned with that CID in the database, then the DRID data with that CID will be a union of at most N+1 intervals, those intervals which are between the RIDs of records that are found in the database. Taking into account all of the replicas, the number of intervals required to represent the DRID data is at most N plus the number of replicas.

If the RIDs for active data in the database are closely packed together, as in the example of FIGS. 2 and 3, then even fewer intervals are required to represent the DRID. At the end of the second replication in FIGS. 2 and 3, there are three records in each database, yet the DRID can be represented by four intervals, one less than the ceiling of five (set by there being three records and two replicas).

DRID_Incremental, the set of RIDs pushed to other databases in a replication, also has an efficient size. It is proportional to one plus the number of RIDs deleted since the last replication.

It, too, is stored in the compressed format disclosed in my copending application, entitled "Compressing Sets of Ids".

RID_Contained is also preferably stored using the same interval compression technique.

In an alternate embodiment, to make it more likely that the RIDs making up DRID and DRID_Sent are clustered in a small number of intervals, and thus better compressed using the format disclosed in the above-referenced application, serial number (SN) assignment is done so that blocks of SNs are set aside for particular databases. That way as new SNs are assigned to any given database, the SNs are contiguous, i.e., without gaps as the result of SNs being assigned for other purposes. This method also has the advantage of not having to check if SN_New is greater than SN_Last_Assigned plus 1, as described above, since that should not occur for any given database.

Figure 8:
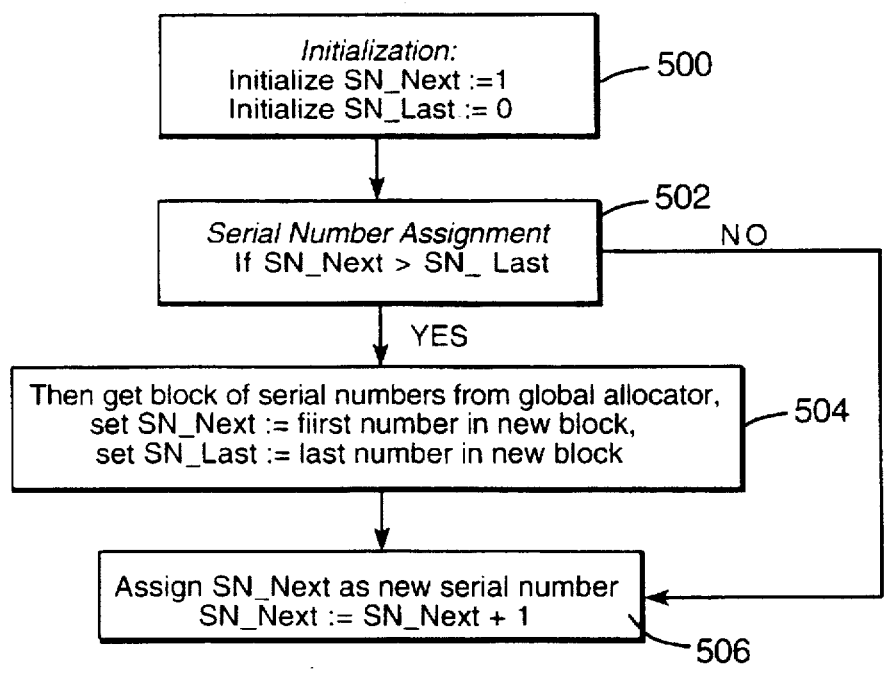
FIG. 8 shows the steps followed to assign new serial numbers from blocks allocated to particular databases.

The method for selecting such blocks and making SN assignments is shown in FIG. 8. During initialization, SN_Next is set to 1, and SN_Last is set to 0 (step 500). Then, each time a new SN is assigned, SN_Next is compared to SN_Last (step 502). If SN_Next is greater than SN_Last (as will be the case after initialization), then the block of SNs previously assigned to this database will have been used up. Accordingly, a new block of serial numbers are requested and assigned to the database (step 504). At that time, SN_Next is set to the first number in the new block and SN_Last is set to the last number in the new block. Then SN_Next is assigned as the new SN, and SN_Next is incremented by 1. If at step 502 SN_Next was less than or equal to SN_Last, then there were still SNs left to be assigned from the current block. Accordingly, the logic skips directly to step 506 where SN_Next is assigned as the new SN and then incremented by one.

Other embodiments of the invention are within the scope of the following claims. For example, the database has been described herein as comprising public folders in a distributed messaging system having message records in these folders. However, the database can comprise any type of information which is capable of being replicated, and the records can similarly comprise files, objects or any other item of data. In addition, the DRID could contain only RIDs of deleted records, rather than also RIDs not assigned to the database. Instead of push replication, the invention could be applied to pull replication schemes. Instead of the incremental DRID scheme described above, the full DRID could be transmitted during each replication (making it unnecessary to generate DRID_Sent and DRID_Incremental). The approach of allocating a block of serial numbers to a database could be extended so that all serial numbers assigned to a particular database are drawn from a unique series of serial numbers assigned to that database.

The parenthetical references in the claims to specific set names (e.g., DRID, DRID_Sent, DRID_Incremental, RID_Contained) is intended only for clarity, and not as a narrowing of the claim to the sets as specifically described in connection with the description of preferred embodiments.

What is claimed is:

1. A method of reducing storage requirements when replicating information regarding deleted records in a distributed network of replicas, wherein records in the replicas have unique record identification numbers, the method comprising the steps of:

storing at a first replica a first set of deleted record identification (DRID) numbers that identify records deleted from the first replica, the first set of DRID numbers being stored without associated change numbers;

modifying the first set of DRID numbers by adding new record identification numbers to the first set of DRID numbers to identify additional records, without associated change numbers, for newly deleted records from the first replica; and replicating information regarding deleted records to other replicas by sending to said other replicas information corresponding to the modified first set of DRID numbers stored in the first replica in order to thereby reduce storage requirements for representing deleted records.

2. The method of claim 1 wherein the first set of DRID numbers is represented by a list of intervals, each interval describing a range of record identification numbers that have been deleted from a replica of the database.

3. The method of claim 2 wherein the first set of DRID numbers includes not only numbers of records deleted from the database but also numbers assigned for purposes other than to identify records in the database.

4. The method of claim 1 wherein a second set of DRID numbers is stored in conjunction with the first set of DRID numbers, wherein the second set of DRID numbers represents the record identification numbers appearing in the first set of DRID numbers that have previously been sent to other replicas, and wherein the information sent to other replicas corresponding to the modified first set of DRID numbers comprises incremental sets of DRID numbers each incremental set representing the difference between the first set of DRID numbers and the second set of DRID numbers.

5. The method of claim 1 wherein a third set of record identification numbers is stored for each replica, the third set containing record identification numbers for records contained in the replica, and wherein during a replication the information corresponding to DRID numbers received from other replicas are compared to the third set to determine whether records in the replica should be deleted.

6. The method of claim 3 wherein the record identification numbers comprise a computer identification number and a unique serial number assigned by the computer on which the record was created, wherein at least some of the serial numbers assigned by the computer are assigned for purposes other than to identify records created in the database.

7. The method of claim 6 wherein a block of the serial numbers are assigned to the database to permit contiguous serial numbers to be assigned to a plurality of records created in the database by that computer.

8. A computer program product for use in a computer system that employs a method for replicating information regarding deleted records in a distributed network of replicas, wherein records in the replicas have unique record identification numbers, the computer program product comprising:

a computer-readable medium for carrying computer program code means used for operating said computer system to employ said method for replicating information regarding deleted records, and computer program code means comprising:

program code means for storing at a first replica a first set of deleted record identification (DRID) numbers that identify records deleted from the first replica, the first set of DRID numbers being stored without associated change numbers;

program code means for modifying the first set of DRID numbers by adding new record identification numbers to the first set of DRID numbers to identify additional records, without associated change numbers, for newly deleted records from the first replica; and program code means for replicating information regarding deleted records to other replicas by sending to said other replicas information corresponding to the modified first set of DRID numbers stored in the first replica in order to thereby reduce storage requirements for representing deleted records.

9. The computer program product of claim 8 wherein the first set of DRID numbers is represented by a list of intervals, each interval describing a range of record identification numbers that have been deleted from a replica of the database.

10. The computer program product of claim 9 wherein the first set of DRID numbers includes not only numbers of records deleted from the database but also numbers assigned for purposes other than to identify records in the database.

11. The computer program product of claim 8 wherein a second set of DRID numbers is stored in conjunction with the first set of DRID numbers, wherein the second set of DRID numbers represents the record identification numbers appearing in the first set of DRID numbers that have previously been sent to other replicas, and wherein the information sent to other replicas corresponding to the modified first set of DRID numbers comprises incremental sets of DRID numbers each incremental set representing the difference between the first set of DRID numbers and the second set of DRID numbers.

12. The computer program product of claim 8 wherein a third set of record identification numbers is stored for each replica, the third set containing record identification numbers for records contained in the replica, and wherein during a replication the information corresponding to DRID numbers received from other replicas are compared to the third set to determine whether records in the replica should be deleted.

13. The computer program of claim 10 wherein the record identification numbers comprise a computer identification number and a unique serial number assigned by the computer on which the record was created, wherein at least some of the serial numbers assigned by the computer are assigned for purposes other than identifying records created in the database.

14. The computer program of claim 13 wherein a block of the serial numbers are assigned to the database to permit contiguous serial numbers to be assigned to a plurality of records created in the database by that computer.

* * * * *

UNITED STATES PATENT AND TRADEMARK OFFICE
CERTIFICATE OF CORRECTION

PATENT NO. : 5,799,321
DATED : Aug 25, 1998
INVENTOR(S) : Max L. Benson

It is certified that error appears in the above-identified patent and that said Letters Patent is hereby corrected as shown below:

On drawing
Fig. 8, Step 504, second line, before "number" change "fiirst" to --first--

Col. 2, line 29, after "set" change "Rid_Contained" to --RID_Contained--

Signed and Sealed this

Twenty-first Day of December, 1999

Attest:

Q. TODD DICKINSON

*Attesting Officer*     *Acting Commissioner of Patents and Trademarks*